(12) United States Patent
Simonds et al.

(10) Patent No.: US 10,016,660 B1
(45) Date of Patent: *Jul. 10, 2018

(54) LIMITED FLIGHT GOLF BALL WITH EMBEDDED RFID CHIP

(71) Applicant: Callaway Golf Company, Carlsbad, CA (US)

(72) Inventors: Vince Simonds, Brimfield, MA (US); David M. Bartels, Carlsbad, CA (US); Grady C. Crahan, Carlsbad, CA (US); Craig Schnell, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,172

(22) Filed: Jul. 13, 2017

Related U.S. Application Data

(63) Continuation of application No. 14/921,243, filed on Oct. 23, 2015, now Pat. No. 9,707,454.

(60) Provisional application No. 62/068,489, filed on Oct. 24, 2014.

(51) Int. Cl.
| | | |
|---|---|---|
| *A63B 43/00* | (2006.01) | |
| *A63B 37/12* | (2006.01) | |
| *A63B 37/00* | (2006.01) | |
| *A63B 45/00* | (2006.01) | |
| *B29C 43/18* | (2006.01) | |
| *G06K 7/10* | (2006.01) | |
| *B29L 31/54* | (2006.01) | |

(52) U.S. Cl.
CPC .......... *A63B 43/004* (2013.01); *A63B 37/002* (2013.01); *A63B 37/009* (2013.01); *A63B 37/0018* (2013.01); *A63B 37/0019* (2013.01); *A63B 37/0031* (2013.01); *A63B 37/0033* (2013.01); *A63B 37/0061* (2013.01); *A63B 37/0064* (2013.01); *A63B 37/0065* (2013.01); *A63B 37/0067* (2013.01); *A63B 37/0074* (2013.01); *A63B 45/00* (2013.01); *B29C 43/18* (2013.01); *G06K 7/10366* (2013.01); *B29C 2043/182* (2013.01); *B29L 2031/546* (2013.01)

(58) Field of Classification Search
USPC .................................................. 473/351–378
See application file for complete search history.

(56) References Cited

U.S. PATENT DOCUMENTS

| | | | | |
|---|---|---|---|---|
| 4,848,770 A | * | 7/1989 | Shama ............... | A63B 37/0003 473/373 |
| 6,152,835 A | * | 11/2000 | Sullivan ............. | A63B 37/0003 473/373 |
| 6,465,546 B1 | * | 10/2002 | Jackson ............. | A63B 37/0003 473/371 |

(Continued)

FOREIGN PATENT DOCUMENTS

| | | | | |
|---|---|---|---|---|
| GB | 2446212 A | * | 8/2008 | ......... A63B 24/0021 |
| JP | 2013154176 A | * | 8/2013 | ........... A63B 43/004 |

*Primary Examiner* — Alvin Hunter
(74) *Attorney, Agent, or Firm* — Michael A. Catania; Sonia Lari; Rebecca Hanovice (57) ABSTRACT

A unique method of embedding an RFID chip into the core of a golf ball and using it in the application of a limited flight range ball for use in a range setup that can receive and monitor RFID signals is disclosed herein. The density of the core material is adjusted in relation to the mass of the RFID chip. The golf ball with an embedded RFID chip conforms to a mass limitation of the USGA.

5 Claims, 5 Drawing Sheets

(56) References Cited

U.S. PATENT DOCUMENTS

| | | | | |
|---|---|---|---|---|
| 6,562,912 B1* | 5/2003 | Sullivan | A63B 37/0003 | 473/373 |
| 6,653,368 B2* | 11/2003 | Jackson | A63B 37/0003 | 473/371 |
| 6,998,965 B1* | 2/2006 | Luciano, Jr. | A63B 24/0021 | 235/375 |
| 7,367,901 B2* | 5/2008 | Watanabe | A63B 37/0004 | 473/374 |
| 7,540,428 B2* | 6/2009 | Baba | G06K 19/07749 | 235/451 |
| 7,598,869 B2* | 10/2009 | Kumagai | G07G 1/009 | 340/10.51 |
| 7,691,009 B2* | 4/2010 | Savarese | A63B 24/0021 | 473/152 |
| 7,699,235 B2* | 4/2010 | Baba | G06K 19/07749 | 235/451 |
| 7,766,766 B2* | 8/2010 | Savarese | A63B 24/0021 | 473/351 |
| 7,791,982 B2* | 9/2010 | Karr | A63B 24/0021 | 367/140 |
| 7,843,334 B2* | 11/2010 | Kumagai | G06Q 30/02 | 340/10.51 |
| 8,319,636 B2* | 11/2012 | Brommer | G06K 17/00 | 340/10.3 |
| 8,360,904 B2* | 1/2013 | Oleson | A63B 24/0062 | 463/36 |
| 8,758,166 B2* | 6/2014 | Savarese | A63B 24/0021 | 473/353 |
| 8,882,606 B2* | 11/2014 | Leech | A63B 24/0006 | 473/223 |
| 9,370,694 B2* | 6/2016 | Luciano, Jr. | A63B 37/0003 | |
| 9,498,680 B2* | 11/2016 | Luciano, Jr. | A63B 37/005 | |
| 9,498,682 B2* | 11/2016 | Luciano, Jr. | A63B 37/0076 | |
| 9,539,471 B2* | 1/2017 | Luciano, Jr. | A63B 37/0003 | |
| 9,707,454 B1* | 7/2017 | Simonds | A63B 43/004 | |
| 2004/0142766 A1* | 7/2004 | Savarese | A63B 24/0021 | 473/353 |
| 2005/0070376 A1* | 3/2005 | Savarese | A63B 24/0021 | 473/353 |
| 2005/0227792 A1* | 10/2005 | McCreary | A63B 24/0003 | 473/409 |
| 2006/0122007 A1* | 6/2006 | Savarese | A63B 24/0021 | 473/351 |
| 2007/0026968 A1* | 2/2007 | Ratcliffe | A63B 24/0021 | 473/353 |
| 2008/0000364 A1* | 1/2008 | Bevirt | A63B 24/0021 | 101/35 |
| 2009/0314423 A1* | 12/2009 | Savarese | A63B 24/0021 | 156/276 |
| 2012/0052967 A1* | 3/2012 | Grieshaber | A63B 37/0003 | 473/155 |
| 2012/0255998 A1* | 10/2012 | Luciano, Jr. | A63B 37/0003 | 235/439 |
| 2012/0255999 A1* | 10/2012 | Luciano, Jr. | A63B 37/0003 | 235/439 |
| 2012/0256731 A1* | 10/2012 | Luciano, Jr. | A63B 37/0003 | 340/10.1 |
| 2013/0165261 A1* | 6/2013 | Luciano, Jr. | A63B 37/005 | 473/371 |
| 2013/0196787 A1* | 8/2013 | Luciano, Jr. | A63B 37/0076 | 473/371 |
| 2013/0196788 A1* | 8/2013 | Shimizu | A63B 43/004 | 473/371 |
| 2015/0379388 A1* | 12/2015 | Komatsu | G06K 19/041 | 473/353 |
| 2017/0001080 A1* | 1/2017 | Komatsu | A63B 43/004 | |

* cited by examiner

LIMITED FLIGHT GOLF BALL WITH EMBEDDED RFID CHIP

CROSS REFERENCES TO RELATED APPLICATIONS

The Present Application is a continuation application of U.S. patent application Ser. No. 14/921,243, filed on Oct. 23, 2015, which claims priority to U.S. Provisional Patent Application No. 62/068,489, filed on Oct. 24, 2014, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to a limited flight golf ball. More specifically, the present invention relates to a limited flight golf ball with an RFID chip embedded therein for identification and tracking.

Description of the Related Art

There are currently limited flight range balls that have construction and aerodynamics designed to restrict the overall height and distance. These balls are generally inexpensive and do not have any unique performance attributes other than their limited flight.

RFID chips (tags) are used in many applications to individually track products. There is prior IP around RFID chips being embedded in golf balls to be used in combination with a device to track the individual ball.

Quimby et al., U.S. Pat. No. 5,910,057 for a Golf Ball With Distance And Locating System discloses a golf ball having a transmitter therein which emits a signal at a frequency of 900 MegaHertz.

BRIEF SUMMARY OF THE INVENTION

The present invention is a unique method of embedding the chip into the core of the golf ball and using it in the application of a limited flight range ball for use in a range setup that can receive and monitor RFID signals.

One aspect of the present invention is a method for manufacturing a limited flight golf ball with an embedded RFID chip. The method includes placing a first half-slug of core material in a mold half. The method also includes placing a RFID chip on a surface of the first half-slug. The method also includes placing the second half slug on the RFID chip. The method also includes molding the first half-slug, the RFID chip and the second half slug using a hot cure compression process to form a golf ball core with an embedded RFID chip. The method also includes molding a cover over the golf ball core to generate a golf ball with an embedded RFID chip. The density of the core material is adjusted in relation to the mass of the RFID chip. The golf ball with an embedded RFID chip conforms to a mass limitation of the USGA.

Another aspect of the present invention is a method for manufacturing a limited flight golf ball with an embedded RFID chip. The method includes placing a first half-slug of core material in a mold half. The method also includes placing a RFID chip on a surface of the first half-slug. The method also includes placing the second half slug on the RFID chip. The method also includes molding the first half-slug, the RFID chip and the second half slug using a hot cure compression process to form a golf ball core with an embedded RFID chip. The method also includes molding a boundary layer over the golf ball core to generate a golf ball precursor product with an embedded RFID chip. The method also includes molding a cover over the golf ball precursor product with an embedded RFID chip to generate a golf ball with an embedded RFID chip. The density of the core material is adjusted in relation to the mass of the RFID chip. The golf ball with an embedded RFID chip conforms to a mass limitation of the USGA.

Yet another aspect of the present invention is a limited flight golf ball. The limited flight golf ball preferably includes a RFID chip configured to transmit a radiofrequency signal, a core composed of a polybutadiene material, and a cover disposed over the core. The RFID chips is disposed within the core. The density of the core material is adjusted in relation to the mass of the RFID chip. The golf ball with an embedded RFID chip conforms to a mass limitation of the USGA.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
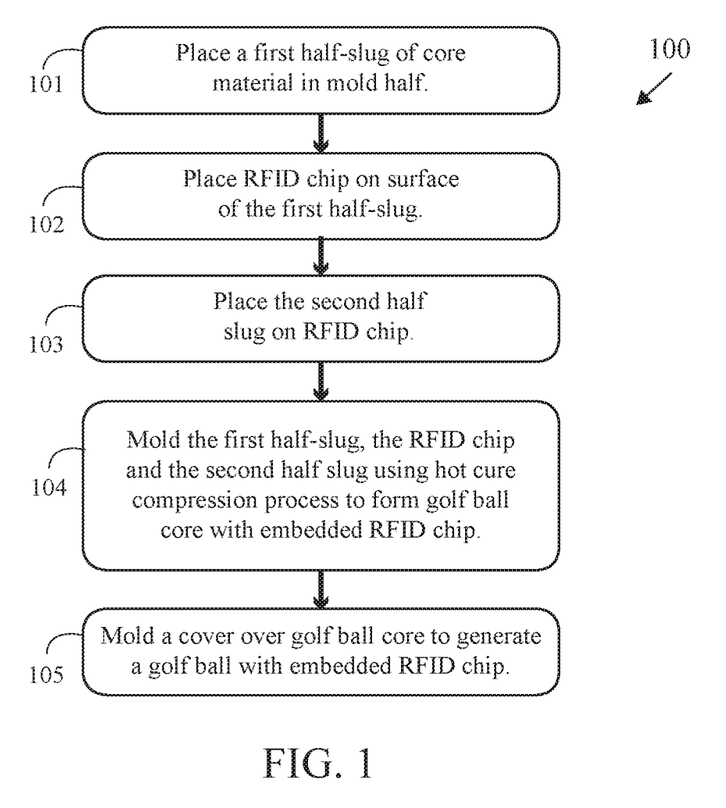
FIG. 1 is a flow chart of a method for forming a limited flight golf ball with an embedded RFID chip.

A method 100 for manufacturing a limited flight golf ball with an embedded RFID chip is shown in FIG. 1. At block 101, a first half-slug of core material is placed in a mold half. At block 102, a RFID chip is placed on a surface of the first half-slug. At block 103, the second half slug is placed on the RFID chip. At block 104, the first half-slug, the RFID chip and the second half slug are molded using a hot cure compression process to form a golf ball core with an embedded RFID chip. At block 105, a cover is molded over the golf ball core to generate a golf ball with an embedded RFID chip. The density of the core material is adjusted in relation to the mass of the RFID chip. The golf ball with an embedded RFID chip conforms to a mass limitation of the USGA.

Figure 1A:
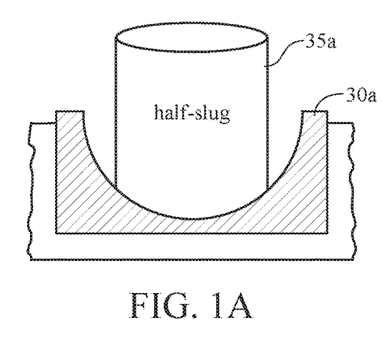
FIG. 1A is an isolated view of a mold half with a half-slug therein.

As shown in FIG. 1A, a half-slug 35a of core material (typically a polybutadiene based mixture) is placed within a mold half 30a of a compression mold.

Figure 1B:
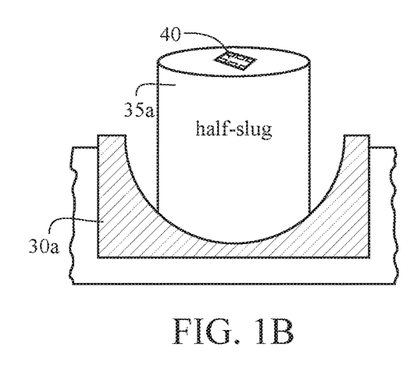
FIG. 1B is an isolated view of a mold half with a half-slug with an RFID chip therein.

As shown in FIG. 1B, an RFID chip 40 is placed on a top surface of the half-slug 35a positioned within the mold half 30a.

Figure 1C:
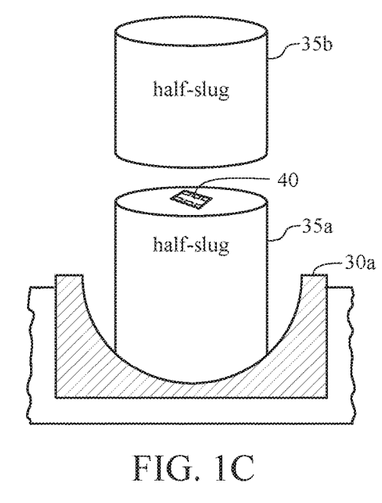
FIG. 1C is an isolated view of a mold half with two half-slugs therein, and an RFID chip positioned between the half-slugs.

As shown in FIG. 1C, a second half-slug 35b is placed over the RFID chip 40 and on top of the first half-slug 35a.

Figure 1D:
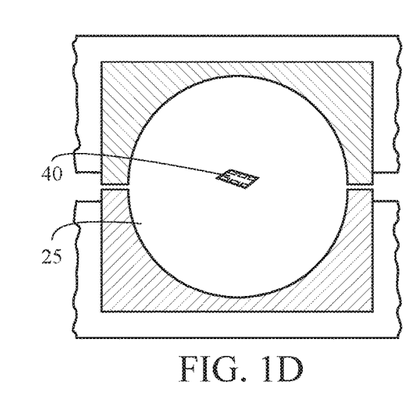
FIG. 1D is a cross-sectional view of a compression mold with a spherical core having an RFID chip embedded therein.

As shown in FIG. 1D, a second mold half 30b compresses the half-slugs 35a and 35b into a spherical core with an embedded RFID chip 40.

The golf ball with the embedded RFID chip preferably has a COR less than 0.70. The golf ball preferably has a lift of 0.1047 at a Reynolds number of 70000 and a RPM of 2125, a lift of 0.2079 at a Reynolds number of 80000 and a RPM of 2125, a drag of 0.2322 at a Reynolds number of 170000 and a RPM of 2125, a drag of 0.2326 at a Reynolds number of 200000 and a RPM of 2125, and a drag of 0.2361 at a Reynolds number of 225000 and a RPM of 2125.

Figure 2:
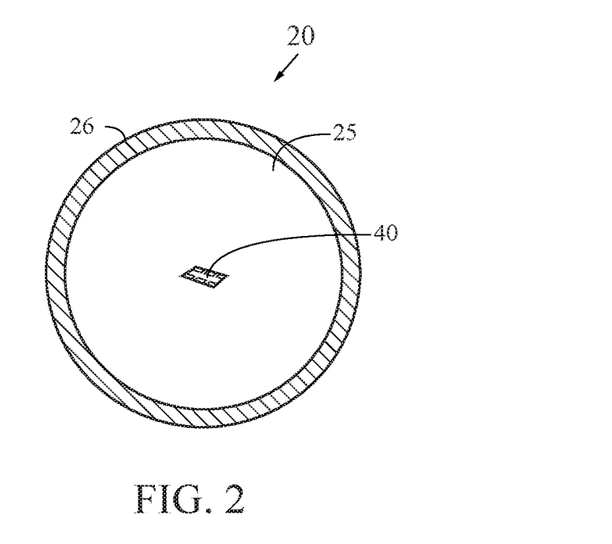
FIG. 2 is a cross-sectional view of a golf ball with an embedded RFID chip.
Figure 3:
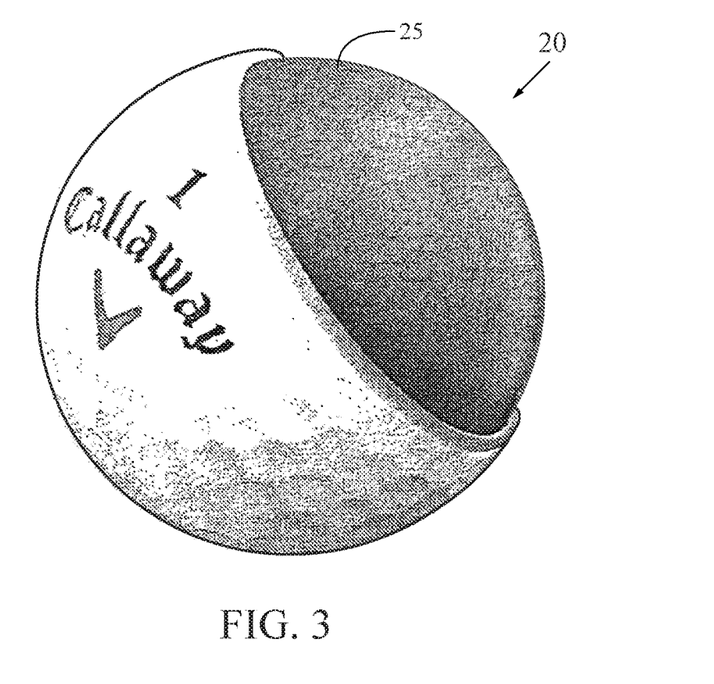
FIG. 3 is a partial cut-away view of a golf ball with an embedded RFID chip.

The cover 26 preferably has a Shore D hardness of 61, a thickness of 0.061 inch and is composed of ionomers. The core 25 preferably has a diameter of 1.56 inches, a mass of 37.8 grams and a deflection of 0.094 inch under a load of 200 pounds. The golf ball 20 with the embedded RFID chip 40 preferably has 336 dimples, wherein each dimple has a radius of 0.076 inch, a chord depth of 0.012 inch, an entry angle of nineteen degrees and an edge radius of 0.04 inch. The golf ball 20 with the embedded chip preferably has a diameter of 1.684 inches, a mass of 45.4 grams, a COR of 0.770 and a deflection of 0.080 inch under a load of 200 pounds.

Figure 6:
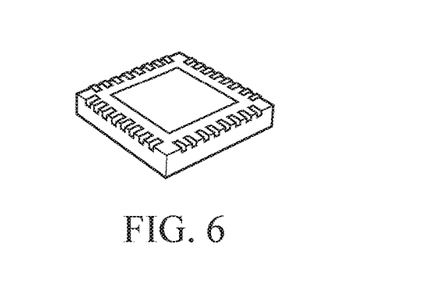
FIG. 6 is an isolated view of a RFID chip.

FIG. 6 is an isolated view of an RFID chip. The present invention takes an RFID chip 40 smaller than ¾"×½"×¼" and sandwiches it between two half slugs 35a and 35b of core material. One half slug 35a is placed in the mold half 30a, the RFID chip 40 is placed on top, the second half slug 35b is placed on top "sandwiching" the RFID chip 40 between the two halves 35a and 35b which are then molded together in a hot cure compression molding process to form the core 25 of the golf ball 20.

The cover 26 is then molded onto the core 25 either by an injection molding or compression molding process. This type of ball can be comprised of multiple cover layers.

The density of the core 25 should be adjusted to account for the density of the RFID chip so that the total ball weight falls with USGA conformance guidelines.

In one of the limited flight golf ball configurations, the COR of the core is reduced to further limit the distance of flight of the ball by decreasing ball speed off the club face. In this configuration the core COR is less than 0.770.

In another configuration, the core weight may be intentionally light weight to further decrease the flight distance of the ball.

Limited Aerodynamics

The surface geometry of this ball is designed to have high drag to reduce overall distance as well as keep its peak apex height lower than a "normal" flight golf ball. This ball can have conventional (circular) dimples or a non-conventional aero design (HEX). The surface geometry is designed to have acceptable lift, particularly at the lower Reynolds Number conditions, so that aerodynamic lift is maintained throughout the entire ball flight. This ensures a stable trajectory that golfers desire.

The aerodynamic drag was increased in the limited flight pattern. In comparison to a standard aero pattern, we tested at a spin of 2125 rpm and obtained values at five different Reynolds Number conditions (70 k, 80 k, 170 k, 200 k, and 225 k). The results are as follows.

Limited Flight
Lift (70 k, 2125 RPM): 0.1047
Lift (80 k, 2125 RPM): 0.2079
Drag (170 k, 2125 RPM): 0.2322
Drag (200 k, 2125 RPM): 0.2326
Drag (225 k, 2125 RPM): 0.2361
Standard Aero:
Lift (70 k, 2125 RPM): 0.2214
Lift (80 k, 2125 RPM): 0.2556
Drag (170 k, 2125 RPM): 0.2250
Drag (200 k, 2125 RPM): 0.2245
Drag (225 k, 2125 RPM): 0.2276.

From this you can see that the limited flight aerodynamics were designed to have much higher drag, particularly at the higher ball speeds. And the lift at the lower Reynolds Number conditions were suitable to maintain good ball flight.

Figure 5:
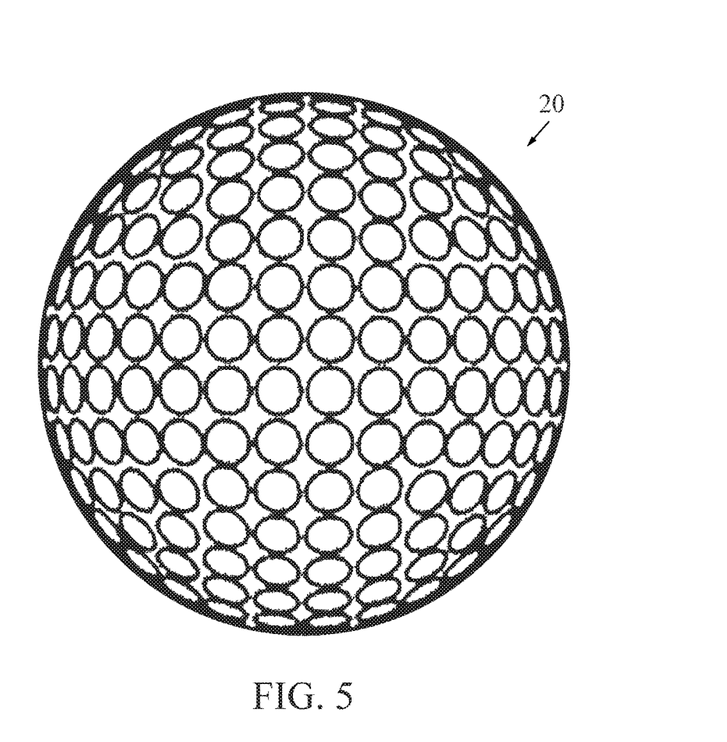
FIG. 5 is a front elevation view of a golf ball with an octahedron dimple pattern having 336 dimples.

As shown in FIG. 5, an exemplary golf ball 20 has an Atti pattern with 336 dimple count with small diameter dimples that are fairly deep to encourage high drag and lift. The percentage of dimple coverage is approximately 68%. Relative to a standard golf ball, the limited flight aerodynamic pattern resulted in approximately 3.9% loss in carry distance (236.5 yards vs 246.2 yards) and a 3.3% reduction in apex height (82.1 feet vs 84.9 feet).

To ensure good aerodynamic performance at the end of flight, the pattern is designed to maintain good lift throughout the end of flight. As a result, there was no loss in distance with a 5-iron shot between the standard aerodynamics and the limited flight aerodynamics, yet the apex height of the limited flight was reduced by approximately 2.7% less (96.3 feet vs 98.9 feet).

Figure 4:
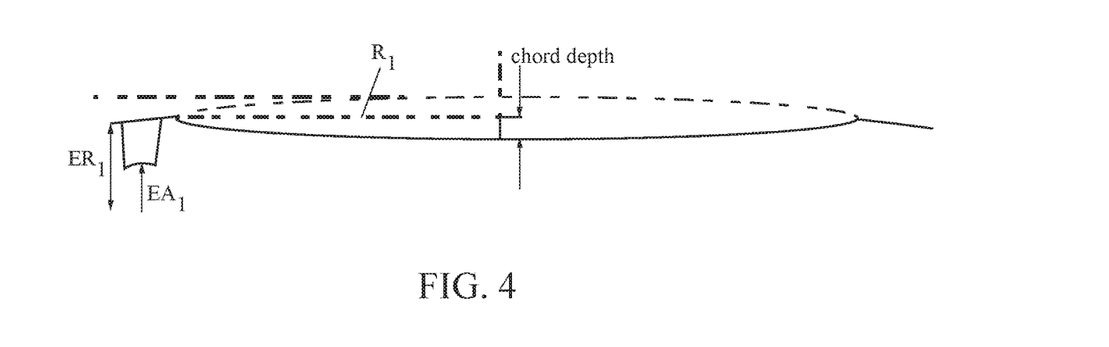
FIG. 4 is an isolated cross-sectional view of a dimple profile.
Figure 4A:
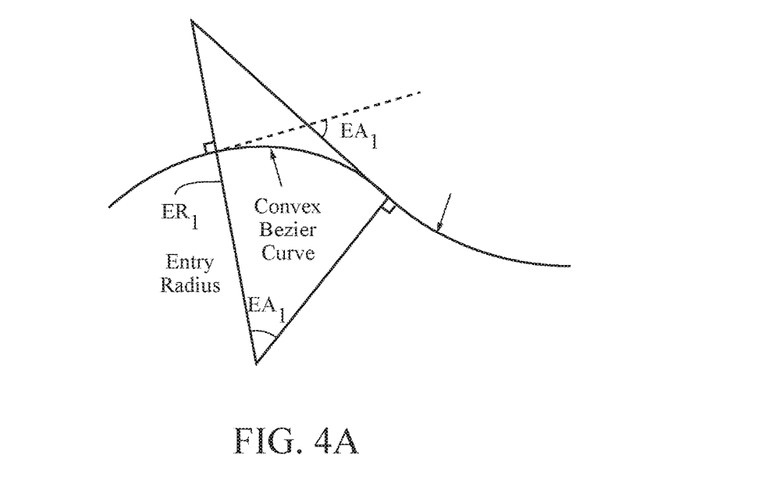
FIG. 4A is an isolated cross-sectional view of a dimple profile.

The dimple geometry used in the exemplary golf ball, and as shown in FIGS. 4 and 4A, were as follows:
Dimple radii=0.076 inch
Dimple chord depth=0.012 inch
Dimple entry angle of 19 degrees
Dimple edge radius=0.04 inch.
Example Ball Construction with Limited Flight Aerodynamics, Normal "Range Ball" COR, and Standard Ball Weight:
Core:
Diameter-1.560 inches,
Mass-37.8 grams,
Deflection-0.094 inch Instron
Cover:
Hardness—61 D,
Thickness 0.061 inch,
Material—Surlyn blend
Ball:
Diameter—1.684 inches,
Mass—45.4 grams,
Deflection—0.080 inch Instron,
COR—0.770
Aero:
HEX aero with 350 geometries.

One aspect of the present invention is a range ball with embedded RFID chip and limited flight aerodynamics providing a reduced apex height.

Another aspect of the present invention is a range ball with embedded RFID chip and limited flight aerodynamics providing a reduced apex height and driver distance that is reduced a greater percentage than 5 iron carry distance.

Another aspect of the present invention is a range ball with embedded RFID chip with low COR (<0.770) and limited flight aerodynamics providing a reduced apex height.

Another aspect of the present invention is a range ball with embedded RFID chip with low COR (<0.770) and limited flight aerodynamics providing a reduced apex height as a result of high drag.

Another aspect of the present invention is a range ball with embedded RFID chip with a light weight core that produces an overall ball weight less than 43.0 grams, and limited flight aerodynamics providing a reduced apex height.

Another aspect of the present invention is a range ball with embedded RFID chip with low COR (<0.770) and a light weight core that produces an overall ball weight <43.0 grams, and limited flight aerodynamics providing a reduced apex height as a result of high drag.

Any of the above with conventional or non-conventional dimples.

All of the above with ball size greater than 1.680 inches.

One construction of a golf ball utilized with the present invention is disclosed in Ogg et al., U.S. Pat. No. 8,651,976 for a Multiple Layer Golf Ball, which is hereby incorporated by reference in its entirety. Another construction of a golf ball utilized with the present invention is disclosed in Ogg et al., U.S. Pat. No. 8,475,298 for a Golf Ball Having Dual Core Deflection Differential, which is hereby incorporated by reference in its entirety.

Components of current golf ball painting systems may be employed with the present invention, and an example of such components are disclosed Skrabski et al., U.S. Pat. No. 6,544,337 for a Golf Ball Painting System, which is hereby incorporated by reference in its entirety.

In a particularly preferred embodiment of the invention, the golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety. Alternatively, the golf ball has an aerodynamic pattern such as disclosed in Ogg, U.S. Pat. No. 6,551,203 for A Golf Ball With Multiple Sets Of Dimples, which is hereby incorporated by reference in its entirety.

In a preferred embodiment, the cover is preferably composed of a thermoplastic polyurethane material, and preferably has a thickness ranging from 0.025 inch to 0.04 inch, and more preferably ranging from 0.03 inch to 0.04 inch. The material of the cover preferably has a Shore D plaque hardness ranging from 30 to 60, and more preferably from 40 to 50. The Shore D hardness measured on the cover is preferably less than 56 Shore D. Preferably the cover 16 has a Shore A hardness of less than 96. Alternatively, the cover 16 is composed of a thermoplastic polyurethane/polyurea material. One example is disclosed in U.S. Pat. No. 7,367,903 for a Golf Ball, which is hereby incorporated by reference in its entirety. Another example is Melanson, U.S. Pat. No. 7,641,841, which is hereby incorporated by reference in its entirety. Another example is Melanson et al, U.S. Pat. No. 7,842,211, which is hereby incorporated by reference in its entirety. Another example is Matroni et al., U.S. Pat. No. 7,867,111, which is hereby incorporated by reference in its entirety. Another example is Dewanjee et al., U.S. Pat. No. 7,785,522, which is hereby incorporated by reference in its entirety.

A discussion of the USGA initial velocity test is disclosed in Yagley et al., U.S. Pat. No. 6,595,872 for a Golf Ball With High Coefficient Of Restitution, which is hereby incorporated by reference in its entirety. Another example is Bartels et al., U.S. Pat. No. 6,648,775 for a Golf Ball With High Coefficient Of Restitution, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for manufacturing a limited flight golf ball with an embedded RFID chip, the method comprising:
   placing a first half-slug of core material in a mold half;
   placing a RFID chip on a surface of the first half-slug;
   placing the second half slug on the RFID chip;
   molding the first half-slug, the RFID chip and the second half slug using a hot cure compression process to form a golf ball core with an embedded RFID chip;
   molding a cover over the golf ball core to generate a golf ball with an embedded RFID chip;
   wherein the density of the core material is adjusted in relation to the mass of the RFID chip;
   wherein the golf ball has a COR less than 0.770 and a mass less than 43.0 grams;
   wherein the golf ball with an embedded RFID chip has a mass no greater than 45.93 grams;
   wherein the golf ball has a lift of 0.1047 at a Reynolds number of 70000 and a RPM of 2125, a lift of 0.2079 at a Reynolds number of 80000 and a RPM of 2125, a drag of 0.2322 at a Reynolds number of 170000 and a RPM of 2125, a drag of 0.2326 at a Reynolds number of 200000 and a RPM of 2125, and a drag of 0.2361 at a Reynolds number of 225000 and a RPM of 2125.

2. The method according to claim 1 wherein the cover has a Shore D hardness of 61, a thickness of 0.061 inch and is composed of ionomers.

3. The method according to claim 1 wherein the golf ball has 336 dimples, wherein each dimple has a radius of 0.076 inch, a chord depth of 0.012 inch, an entry angle of nineteen degrees and an edge radius of 0.04 inch.

4. A method for manufacturing a limited flight golf ball with an embedded RFID chip, the method comprising:
   placing a first half-slug of core material in a mold half;
   placing a RFID chip on a surface of the first half-slug;
   placing the second half slug on the RFID chip;
   molding the first half-slug, the RFID chip and the second half slug using a hot cure compression process to form a golf ball core with an embedded RFID chip;
   molding a cover over the golf ball core to generate a golf ball with an embedded RFID chip;

wherein the density of the core material is adjusted in relation to the mass of the RFID chip;

wherein the golf ball has a COR less than 0.770 and a mass less than 43.0 grams;

wherein the golf ball with an embedded RFID chip has a mass no greater than 45.93 grams;

wherein the core has a diameter of 1.56 inches, a mass of 37.8 grams and a deflection of 0.094 inch under a load of 200 pounds.

5. A method for manufacturing a limited flight golf ball with an embedded RFID chip, the method comprising:

placing a first half-slug of core material in a mold half;

placing a RFID chip on a surface of the first half-slug;

placing the second half slug on the RFID chip;

molding the first half-slug, the RFID chip and the second half slug using a hot cure compression process to form a golf ball core with an embedded RFID chip;

molding a cover over the golf ball core to generate a golf ball with an embedded RFID chip;

wherein the density of the core material is adjusted in relation to the mass of the RFID chip;

wherein the golf ball has a COR less than 0.770 and a mass less than 43.0 grams;

wherein the golf ball with an embedded RFID chip has a mass no greater than 45.93 grams;

wherein the golf ball has a deflection of 0.080 inch under a load of 200 pounds.

* * * * *